(12) United States Patent
Chae

(10) Patent No.: US 11,465,294 B2
(45) Date of Patent: Oct. 11, 2022

(54) ARTIFICIAL INTELLIGENCE ROBOT FOR PERFORMING CLEANING USING POLLUTION LOG AND METHOD FOR SAME

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 573 days.

(21) Appl. No.: 16/584,427

(22) Filed: Sep. 26, 2019

(65) Prior Publication Data

US 2020/0016764 A1    Jan. 16, 2020

(30) Foreign Application Priority Data

Aug. 26, 2019    (KR) .................. 10-2019-0104755

(51) Int. Cl.
  *B25J 11/00*    (2006.01)
  *B25J 9/16*    (2006.01)
  *G06F 17/18*    (2006.01)
  *G06K 9/62*    (2022.01)
  *G06N 20/00*    (2019.01)

(52) U.S. Cl.
  CPC ........... *B25J 11/0085* (2013.01); *B25J 9/163* (2013.01); *G06F 17/18* (2013.01); *G06K 9/6218* (2013.01); *G06K 9/6267* (2013.01); *G06N 20/00* (2019.01)

(58) Field of Classification Search
  CPC ..... B25J 11/0085; B25J 9/163; G06K 9/6218; G06K 9/6267; G06N 20/00
  See application file for complete search history.

(56) References Cited

U.S. PATENT DOCUMENTS

| | | | | |
|---|---|---|---|---|
| 10,575,699 | B2* | 3/2020 | Bassa | G05D 1/0246 |
| 10,795,377 | B2* | 10/2020 | Afrouzi | A47L 9/0488 |
| 11,108,583 | B2* | 8/2021 | Ray | G06N 20/00 |

FOREIGN PATENT DOCUMENTS

| | | |
|---|---|---|
| KR | 20190073139 | 6/2019 |
| KR | 20190094318 | 8/2019 |

OTHER PUBLICATIONS

Korean Intellectual Property Office Application Serial No. 10-2019-0104755, Notice of Allowance dated Feb. 26, 2021, 6 pages.

* cited by examiner

*Primary Examiner* — Phuoc Tran
(74) *Attorney, Agent, or Firm* — Lee, Hong, Degerman, Kang & Waimey PC

(57) ABSTRACT

The present invention provides an artificial intelligence includes a memory configured to store a plurality of pollution logs; a learning processor configured to classify the plurality of pollution logs into at least one pollution log group based on a similarity between pollution information; a map generator configured to generate an indoor area map to which location of each of at least one pollution log group is mapped; and a processor which determines a cleaning method for each of the at least one pollution log group and performs cleaning for each of the at least one pollution log group according to the determined cleaning method.

16 Claims, 11 Drawing Sheets

ARTIFICIAL INTELLIGENCE ROBOT FOR PERFORMING CLEANING USING POLLUTION LOG AND METHOD FOR SAME

CROSS-REFERENCE TO RELATED APPLICATION

Pursuant to 35 U.S.C. § 119(a), this application claims the benefit of earlier filing date and right of priority to Korean Patent Application No. 10-2019-0104755, filed on Aug. 26, 2019, the contents of which are hereby incorporated by reference herein in its entirety.

BACKGROUND

The present invention relates to an artificial intelligence robot capable of performing cleaning using a pollution log and a method for the same. Specifically, the present invention relates to an artificial intelligence robot which classifies a plurality of pollution logs into each pollution log group based on a similarity between the pollution information, determines a suitable cleaning method for each pollution log group, and performing the cleaning and a method for the same.

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Meanwhile, technologies for recognizing and learning surrounding context using artificial intelligence and providing information desired by a user in a desired form or performing an operation or a function desired by a user have been actively researched.

In addition, an electronic device providing such various operations and functions may be referred to as an artificial intelligence device.

Meanwhile, the robot cleaner is an artificial intelligence device that automatically cleans by inhaling foreign matters such as dust from the floor surface while traveling by itself in an area to be cleaned without the user's manipulation.

The robot cleaner recognizes the structure of the space, sets a cleaning path, and performs a cleaning operation while traveling along the set cleaning path. The robot cleaner performs cleaning according to a predetermined schedule or based on a user's command.

However, since the robot cleaner of the related art simply performs cleaning along a predetermined moving line, the robot cleaner cannot provide a cleaning operation considering a type of pollution, a pollution degree, and a cleaning time.

If the robot cleaner performs the cleaning considering the type of pollution, the pollution degree, and the cleaning time, the efficiency of cleaning may be increased and the user's satisfaction may be increased.

SUMMARY

An object of the present invention is to solve the above and other problems.

The present invention is to provide an artificial intelligence robot which performs the cleaning using the pollution log and a method for the same.

In addition, the present invention is to provide an artificial intelligence robot that classifies a pollution log including pollution information collected while being traveled and location information where the pollution information is collected into pollution log groups and performs suitable cleaning for each pollution log group and a method for the same.

In addition, the present invention is to provide an artificial intelligence robot which monitors cleaning result when the cleaning by each pollution log group is performed and performs the suitable cleaning by reflecting the monitored cleaning results and a method for the same.

According to an embodiment of the present invention, there is provided an artificial intelligence robot including: a memory configured to store a plurality of pollution logs, a learning processor configured to classify the plurality of pollution logs into at least one pollution log group based on a similarity between pollution information; a map generator configured to generate an indoor area map to which location of each of at least one pollution log group is mapped; and a processor configured to determine a cleaning method with respect to each of the at least one pollution log group, and perform cleaning with respect to each of the at least one pollution log group according to the determined cleaning method.

In addition, according to an embodiment of the present invention, there is provided an artificial intelligence robot including: a processor configured to acquire cleaning evaluation result information with respect to each of the pollution log groups, and determine a cleaning method for each of the pollution log groups using the cleaning evaluation result information.

In addition, according to an embodiment of the present invention, there is provided an artificial intelligence robot including: an learning processor which classifies the plurality of pollution logs into at least one pollution log group based on the pollution type, the pollution degree, and the cleaning time included in each of the plurality of pollution information.

In addition, according to an embodiment of the present invention, there is provided an artificial intelligence robot including: a learning processor which labels information on a representative pollution type, a representative pollution degree, and an average cleaning time with respect to each of the at least one pollution log group.

In addition, according to an embodiment of the present invention, there is provided an artificial intelligence robot including: a processor configured to determine a cleaning method with respect to each of the at least one pollution log group based on the representative pollution type and the representative pollution degree of each of the at least one pollution log group.

In addition, according to an embodiment of the present invention, there is provided an artificial intelligence robot including: a processor configured to assign cleaning priority with respect to each of the at least one pollution log group, and perform cleaning with respect to each of the at least one pollution log group according to the determined cleaning method and the cleaning priority.

In addition, according to an embodiment of the present invention, there is provided an artificial intelligence robot including: a processor configured to assign cleaning priority with respect to each of at least one pollution log group based on the representative pollution degree of each of the at least one pollution log group, in a case where the cleaning available time of the artificial intelligence robot is smaller than the sum of the average cleaning time of each of the at least one pollution log group.

According to an embodiment of the present invention, there is provided a cleaning method including: storing a plurality of pollution logs, classifying the plurality of pollution logs into at least one pollution log group based on a similarity between the pollution information, generating an indoor zone map to which location of each of at least one pollution log group is mapped, determining a cleaning method with respect to each of the at least one pollution log group, and Performing cleaning with respect to each of the at least one pollution log group according to the determined cleaning method.

In addition, according to an embodiment of the present invention, there is provided a cleaning method including: acquiring cleaning evaluation result information with respect to each of the pollution log groups, and determining a cleaning method for each of the pollution log groups using the cleaning evaluation result information.

In addition, according to an embodiment of the present invention, there is provided a cleaning method including: classifying the plurality of pollution logs into at least one pollution log group based on the pollution type, the pollution degree, and the cleaning time included in each of the plurality of pollution information.

In addition, according to an embodiment of the present invention, there is provided a cleaning method including: labeling information on a representative pollution type, a representative pollution degree, and an average cleaning time with respect to each of the at least one pollution log group.

In addition, according to an embodiment of the present invention, there is provided a cleaning method including: determining a cleaning method with respect to each of the at least one pollution log group based on the representative pollution type and the representative pollution degree of each of the at least one pollution log group.

In addition, according to an embodiment of the present invention, there is provided a cleaning method including: assigning cleaning priority to each of the at least one pollution log group, and performing cleaning with respect to each of the at least one pollution log group according to the determined cleaning method and the cleaning priority.

In addition, according to an embodiment of the present invention, there is provided a cleaning method including: assigning cleaning priority with respect to each of at least one pollution log group based on the representative pollution degree of each of the at least one pollution log group, in a case where the cleaning available time of the artificial intelligence robot is smaller than the sum of the average cleaning time of each of the at least one pollution log group.

According to an embodiment of the present invention, an artificial intelligence device having a cleaning function may perform an effective cleaning by determining a suitable cleaning method using a pollution log and performing cleaning.

In addition, according to various embodiments of the present invention, the user's satisfaction may be increased by performing cleaning on the area that needs to be cleaned preferentially according to the pollution log.

DETAILED DESCRIPTION OF THE EMBODIMENTS

Figure 1:
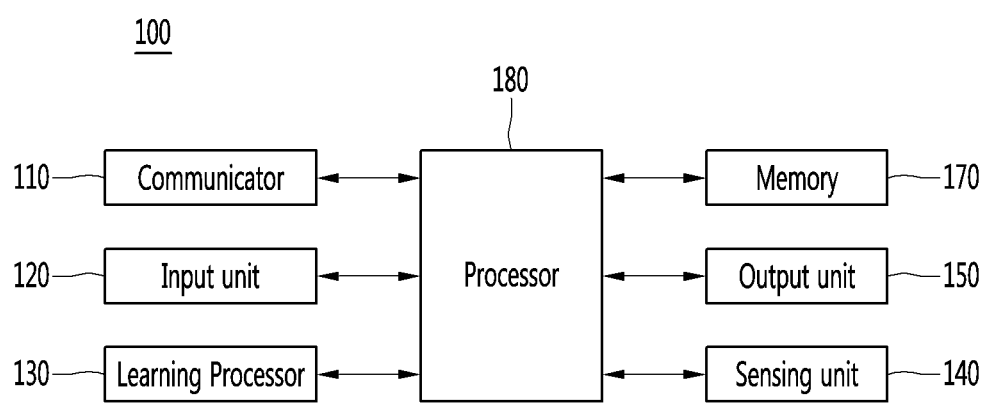
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task. An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network. Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention. The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input unit 120, a learning processor 130, a sensing unit 140, an output unit 150, a memory 170, and a processor 180.

The communicator 110 may transmit and receive data to and from external devices such as other AI devices 100a to 100e and the AI server 200 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information. The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
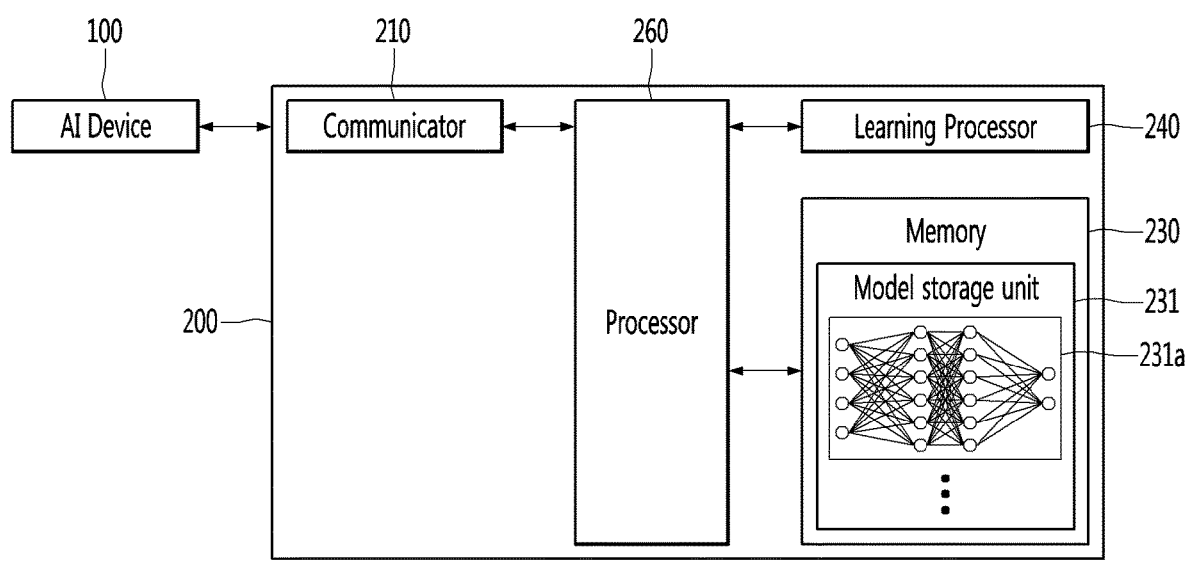
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communicator 210, a memory 230, a learning processor 240, a processor 260, and the like.

The communicator 210 can transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
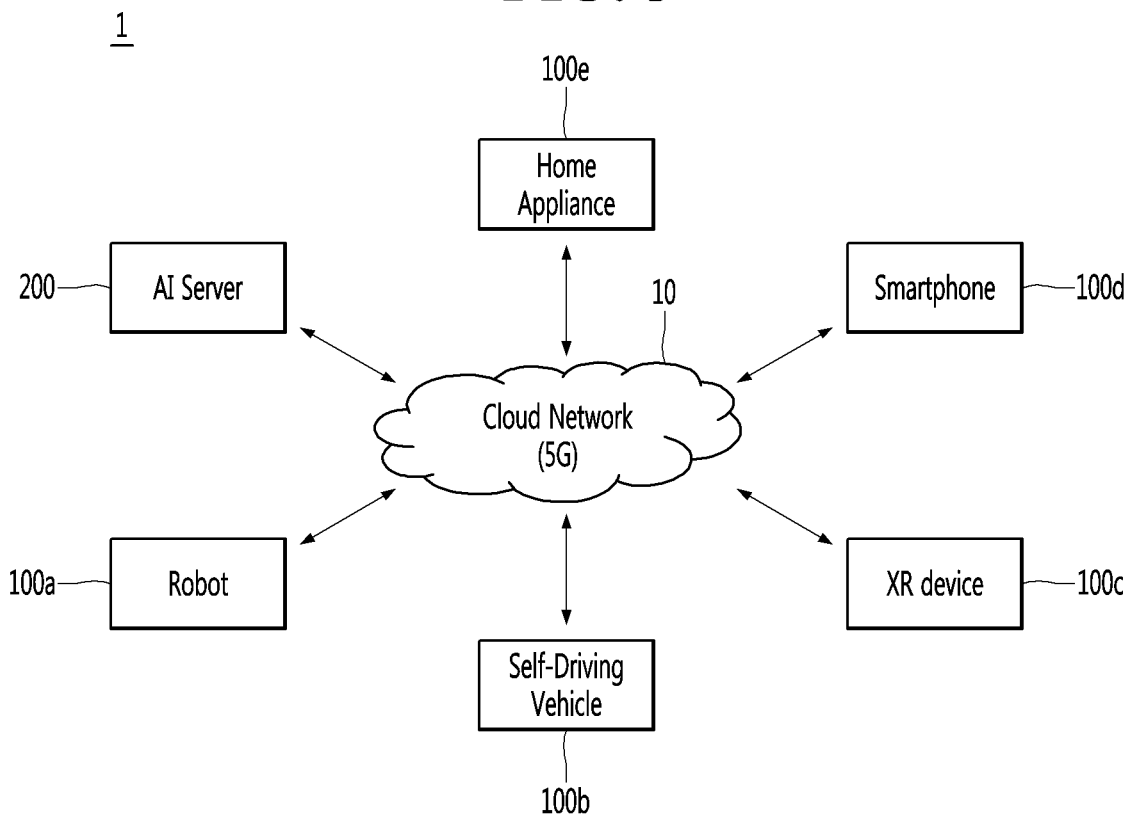
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

First, artificial intelligence (AI) will be described briefly.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values acquired through the multiplication may be summated. When the sum is greater than a threshold value of a neuron, the neuron may be activated and may output an output value acquired through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is acquired through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network has a configuration that is specified by a configuration of a model, an activation function, a loss function or a cost function, a learning algorithm, an optimization algorithm, or the like, a hyperparameter may be preset before learning, and then, a model parameter may be set through learning to specify information.

For example, a factor for determining a configuration of the artificial neural network may include the number of hidden layers, the number of hidden nodes included in each hidden layer, an input feature vector, a target feature vector, or the like.

The hyperparameter may include various parameters that need to be initially set for learning, such as an initial value of the model parameter. The model parameter may include various parameters to be determined through learning.

For example, the hyperparameter may include a weight initial value between nodes, a bias initial value between nodes, a size of mini-batch, a number of repetitions of learning, a learning rate, or the like. The model parameter may include a weight between nodes, bias between nodes, or the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use mean square error (MSE) or cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may refer to a learning rate.

The GD may partially differentiate the loss function with each of model parameters to acquire gradients and may change and update the model parameters by the learning rate in the acquired gradient direction.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Figure 4:
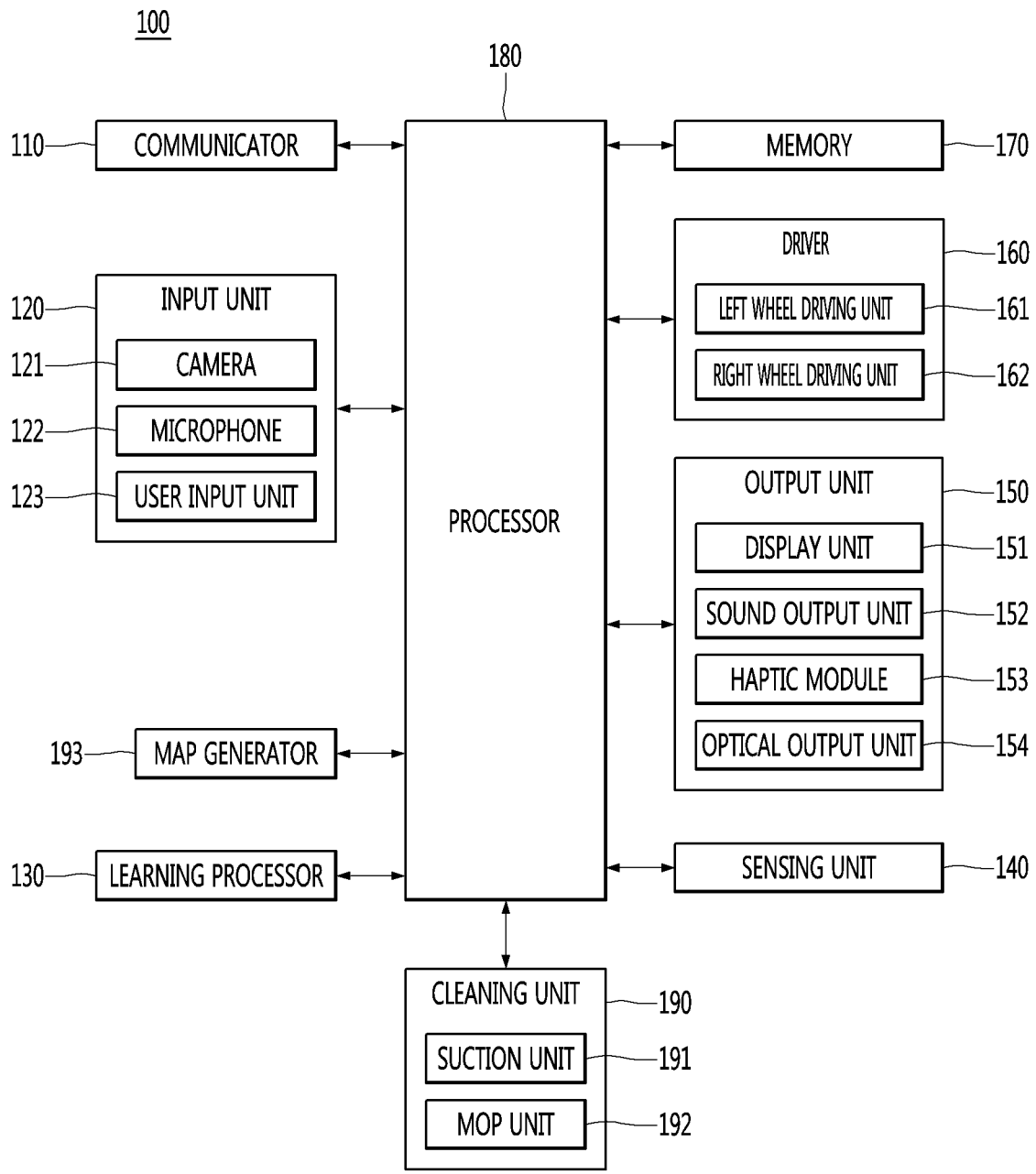
FIG. 4 illustrates the AI device 100 according to an embodiment of the present invention.

FIG. 4 illustrates the AI device 100 according to an embodiment of the present invention.

Description overlapping with FIG. 1 will be omitted.

Hereinafter, the AI device or artificial intelligence device may be referred to as an AI robot or an artificial intelligence robot.

Referring to FIG. 4, the artificial intelligence robot 100 may further include a driver 160, a cleaning unit 190, and a map generator 193.

The input unit 120 may include a camera 121 for inputting an image signal, a microphone 122 for receiving an audio signal, and a user input unit 123 for receiving information from a user.

The voice data or the image data collected by the input unit 120 may be analyzed and processed as a user's control command.

The input unit 120 is for inputting image information (or signal), audio information (or signal), data, or information input from a user, and in order to input image information, the artificial intelligence robot 100 may be provided with one or a plurality of cameras 121.

The camera 121 processes image frames such as still images or moving images acquired by the image sensor in the video call mode or the photographing mode. The processed image frame may be displayed on the display unit 151 or stored in the memory 170.

The microphone 122 processes external sound signals into electrical voice data. The processed voice data may be utilized in various ways according to a function (or an application program being executed) performed by the artificial intelligence robot 100. Meanwhile, various noise removing algorithms may be applied to the microphone 122 to remove noise generated in the process of receiving an external sound signal.

The user input unit 123 is to receive information from a user. When information is input through the user input unit 123, the processor 180 may control the operation of the artificial intelligence robot 100 to correspond to the input information.

The user input unit 123 may include mechanical input means (or a mechanical key, for example, a button, a dome switch, a jog wheel, a jog switch, or the like located on a front surface or a rear surface or a side surface of the artificial intelligence robot 100) and touch input means. As an example, the touch input means may include a virtual key, a soft key, or a visual key displayed on a touch screen through a software process, a touch key which is disposed on a portion other than the touch screen.

The sensing unit 140 may be referred to as a sensor unit.

The sensing unit 140 may include one or more of a depth sensor (not illustrated), an RGB sensor (not illustrated), a collision detection sensor (not illustrated), and a precipice sensor (not illustrated), and may acquire image data around the artificial intelligence robot 100.

The depth sensor may detect that light emitted from the light emitting unit (not illustrated) is reflected by the object and returned. The depth sensor may measure a distance to an object based on a difference in time of detecting the returned light, the amount of the returned light, and the like.

The depth sensor may acquire 2D image information or 3D image information around the artificial intelligence robot 100 based on the measured distance between objects.

The RGB sensor may acquire color image information about an object or a user around the artificial intelligence robot 100. The color image information may be a captured image of an object. The RGB sensor can be referred to as an RGB camera.

At this time, the camera 121 may mean an RGB sensor.

The collision detection sensor may be referred to as a bumper sensor and may measure an impact amount.

The precipice sensor may be referred to as a cliff sensor and may measure a distance to a bottom surface of the artificial intelligence device 100.

At this time, the precipice sensor may be implemented as an optical sensor or a depth sensor.

The sensor information acquired by the sensing unit 140 may be used to detect an object or an obstacle.

The output unit 150 may include at least one of a display unit 151, a sound output unit 152, a haptic module 153, and an optical output unit 154.

The display unit 151 displays (outputs) information processed by the artificial intelligence robot 100. For example, the display unit 151 may display execution screen information of an application program driven by the artificial intelligence robot 100, or User Interface (UI) or Graphic User Interface (GUI) information according to the execution screen information.

The display unit 151 forms a layer structure with or is integrally formed with the touch sensor, thereby implementing a touch screen. The touch screen may function as a user input unit 123 that provides an input interface between the artificial intelligence robot 100 and the user, and may also provide an output interface between the artificial intelligence robot 100 and the user.

The sound output unit 152 may output audio data received from the communicator 110 or stored in the memory 170 in a call signal reception, a call mode or a recording mode, a voice recognition mode, a broadcast reception mode, and the like.

The sound output unit 152 may include at least one of a receiver, a speaker, and a buzzer.

The haptic module 153 generates various haptic effects that a user can feel. A representative example of the tactile effect generated by the haptic module 153 may be vibration.

The light output unit 154 outputs a signal for notifying the occurrence of an event by using light of a light source of the artificial intelligence robot 100. Examples of events generated by the artificial intelligence robot 100 may be message reception, call signal reception, missed call, alarm, schedule notification, email reception, information reception through an application, and the like.

The driver 160 may move the artificial intelligence robot 100 in a specific direction or by a specific distance.

The driver 160 may include a left wheel driving unit 161 for driving the left wheel of the artificial intelligence robot 100 and a right wheel driving unit 162 for driving the right wheel.

The left wheel driving unit 161 may include a motor for driving the left wheel, and the right wheel driving unit 162 may include a motor for driving the right wheel.

In FIG. 4, the driver 160 includes the left wheel driving unit 161 and the right wheel driving unit 162, as an example, but the present invention is not limited thereto. In other words, in one embodiment, the driver 160 may be composed of only one wheel.

The cleaning unit 190 may include at least one of the suction unit 191 and the mop unit 192 to clean the floor near the artificial intelligence robot 100.

The suction unit 191 may be referred to as a vacuum cleaner.

The suction unit 191 may suction air to suction foreign matters such as dust or garbage around the artificial intelligence robot 100.

At this time, the suction unit 191 may include a brush or the like as a means for collecting the foreign matter.

The mop unit 192 may wipe the floor in a state where the mop is at least partially in contact with the bottom surface of the artificial intelligence robot 100.

At this time, the mop unit 192 may include a mop and a mop driving unit for moving the mop.

At this time, in the mop of the mop unit 192, the distance from the ground through the mop driving unit may be adjusted. In other words, the mop driving unit may operate so that the mop contacts the ground when the mop is necessary.

The map generator 193 generates a map of the cleaning area based on the information on the obstacle.

The map generator 193 generates a map of the cleaning area based on the obstacle information acquired by the artificial intelligence robot while driving the cleaning area during the initial operation or when the map for the cleaning area is not stored. In addition, the map generator 220 updates the pre-generated map based on the obstacle information acquired while driving.

The map generator 193 generates a base map based on obstacle information acquired while driving, and generates an indoor zone map by dividing the zone from the base map.

The base map is a map in which the shape of the cleaning area acquired through driving is displayed as an outline, and the indoor zone map is a map in which zones are divided on the base map. The base map and the indoor zone map include information on the drivable area and obstacles of the robot cleaner.

After generating the base map, the map generation unit 193 divides the cleaning zone into a plurality of zones, includes a connection passage connecting the plurality of zones, and generates a map including information on obstacles in each zone.

The map generator 193 processes the shape of the zone based on the shape of a general homeroom, for example, a quadrangle. In addition, the map generator 193 expands the shape of the zone based on the outermost cell of the base map and processes the shape of the zone by deleting or reducing the zone with respect to the inaccessible zone due to the obstacle.

In addition, the map generating unit 193 may display obstacles over a predetermined size on the map according to the size of the obstacle, and delete cells corresponding to the obstacles having a size less than a predetermined size so that the obstacle having a size less than a certain size is not displayed on the base map. For example, the map generating unit displays furniture such as chairs or sofas having size more than a certain size on the map and deletes temporarily displayed obstacles, small obstacles, for example, small toys, or the like from the map. The map generating unit 193 stores the location of a charging station together on the map when the map is generated.

The map generating unit 193 may add the obstacle on the map with respect to the detected obstacle after the map is generated. The map generating unit 193 adds an obstacle to the map when a specific obstacle is repeatedly detected at a fixed position and ignores the obstacle when the obstacle is temporarily detected.

Figure 5:
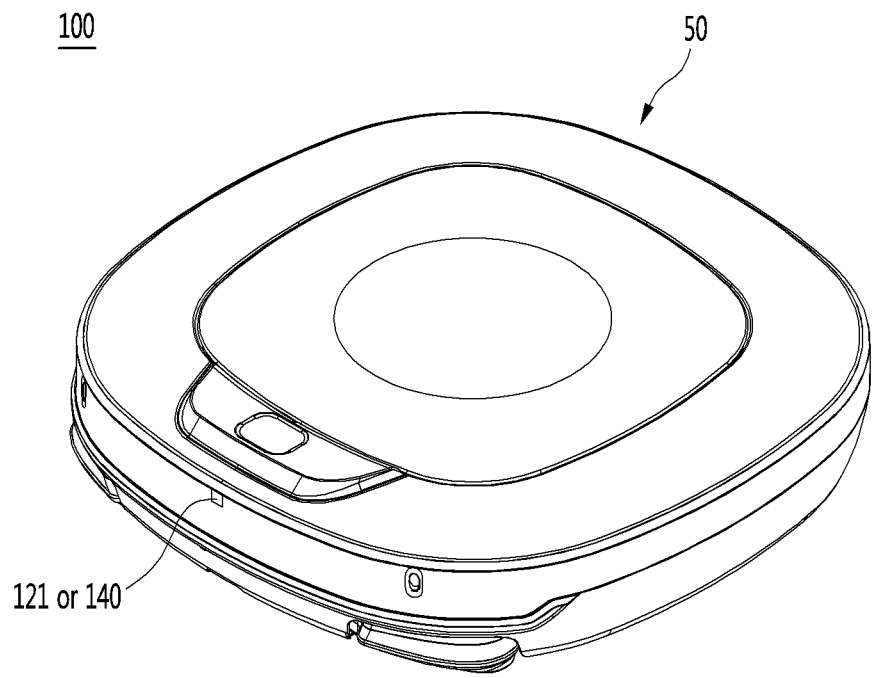
FIG. 5 is a perspective view illustrating the artificial intelligence robot 100 according to an embodiment of the present invention.

FIG. 5 is a perspective view illustrating the artificial intelligence robot 100 according to an embodiment of the present invention.

Referring to FIG. 5, the artificial intelligence robot 100 may include a cleaner main body 50, a camera 121, or a sensing unit 140.

The camera 121 or the sensing unit 140 may irradiate light to the front and receive the reflected light.

The camera 121 or the sensing unit 140 may acquire depth information by using a difference in time in which the received light is returned.

The cleaner main body 50 may include other components except for the camera 121 and the sensing unit 140 among the components described with reference to FIG. 4.

Figure 6:
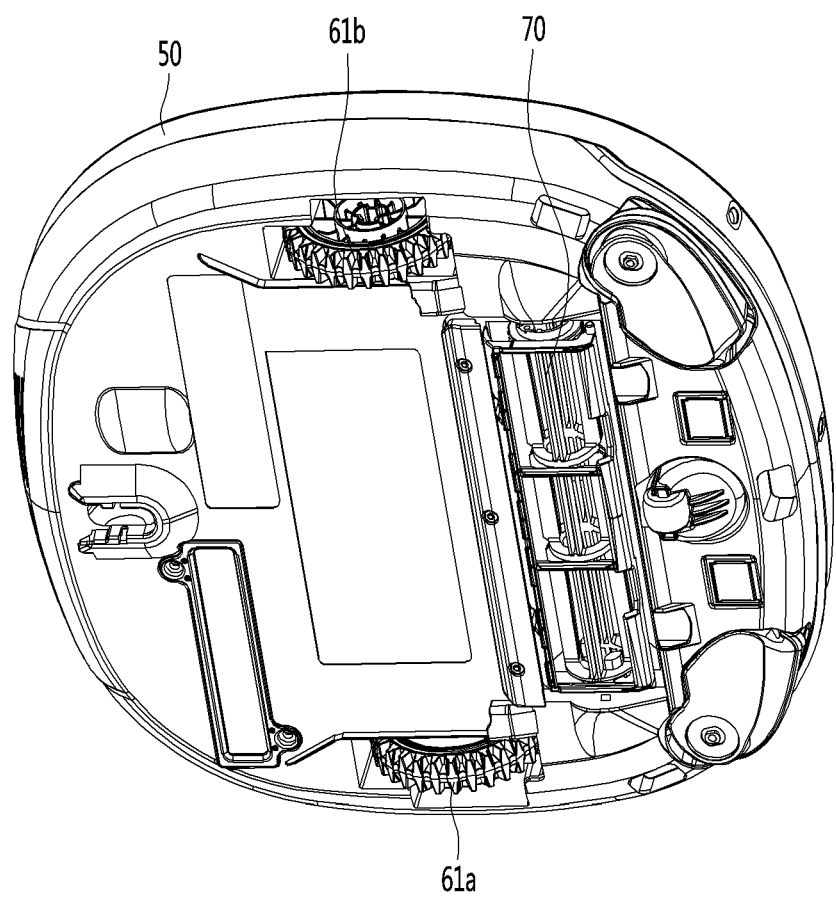
FIG. 6 is a bottom view illustrating the artificial intelligence robot 100 according to an embodiment of the present invention.

FIG. 6 is a bottom view illustrating the artificial intelligence robot 100 according to an embodiment of the present invention.

Referring to FIG. 6, in addition to the configuration of FIG. 4, the artificial intelligence robot 100 may further include a cleaner main body 50, a left wheel 61a, a right wheel 61b, and a suction unit 70.

The left wheel 61a and the right wheel 61b can travel the cleaner main body 50.

The left wheel drive unit 161 may drive the left wheel 61a, and the right wheel drive unit 162 may drive the right wheel 61b.

As the left wheel 61a and the right wheel 61b are rotated by the driver 160, the artificial intelligence robot 100 may suck foreign matters such as dust or garbage through the suction unit 70.

The suction unit 70 may be provided in the cleaner main body 50 to suck dust from the bottom surface.

The suction unit 70 may further include a filter (not illustrated) that collects foreign matters from the suctioned airflow, and a foreign matter receiver (not illustrated) in which foreign matters collected by the filter are accumulated.

In addition to the configuration of FIG. 4, the artificial intelligence robot 100 may further include a mop unit (not illustrated).

The mop unit (not illustrated) may include a mop (not illustrated) and a motor (not illustrated) that rotates in a state in which the mop contacts the bottom surface or moves according to a set pattern. The artificial intelligence robot 100 may wipe the bottom surface through a mop unit (not illustrated).

Figure 7:
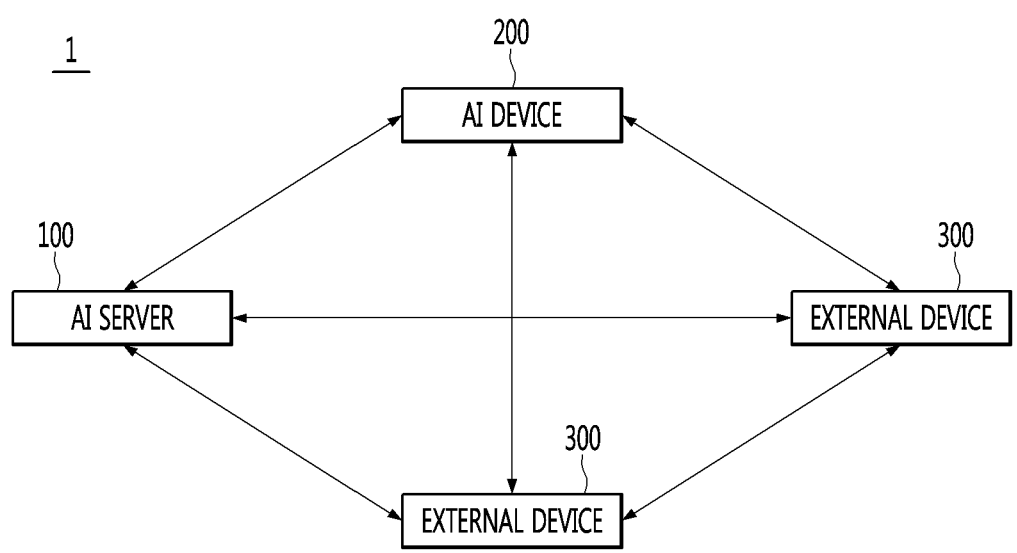
FIG. 7 is a diagram illustrating an example of the artificial intelligence system 1 according to an embodiment of the present invention.

FIG. 7 is a diagram illustrating an example of the artificial intelligence system 1 according to an embodiment of the present invention.

Referring to FIG. 7, the artificial intelligence system 1 may include an artificial intelligence robot 100, an artificial intelligence server 200, and one or more external devices 300.

The artificial intelligence robot 100, the artificial intelligence server 200, and the external device 300 may communicate with each other using wired or wireless communication technology.

In particular, some of the artificial intelligence robot 100, artificial intelligence server 200, or the external device 300 may communicate with each other using 5G network technology.

In addition, the artificial intelligence robot 100 may acquire identification information and location information of at least one external device 300. The artificial intelligence robot 100 may identify each of the at least one external device 300. When the artificial intelligence robot 100 receives data from the external device 300, the artificial intelligence robot 100 may identify the external device 300 that transmits the data and determine the location of the corresponding external device 100.

The external device 300 may include an artificial intelligence robot, an IoT apparatus, a television, an air conditioner, a refrigerator, a washing machine, a home security camera, an air cleaner, a home appliance, or the like.

For example, the external device 300 may include at least one of a microphone capable of collecting voice data, a camera or image sensor capable of collecting image data, a vibration sensor capable of collecting vibration data, and a dust sensor capable of collecting dust concentration data, a depth sensor capable of collecting object distance data, an illuminance sensor capable of collecting illuminance data, a temperature sensor capable of collecting temperature data, and a humidity sensor capable of collecting humidity data.

The external device 300 may acquire data including at least one of voice data, image data, vibration data, dust concentration data, object distance data, illuminance data, temperature data, and humidity data, and may transmit the acquired data into an artificial intelligence robot 100.

In addition, each of the external devices 300 may transmit the living information sensed for each zone directly or through the artificial intelligence server 200 to the artificial intelligence robot 100.

Figure 8:
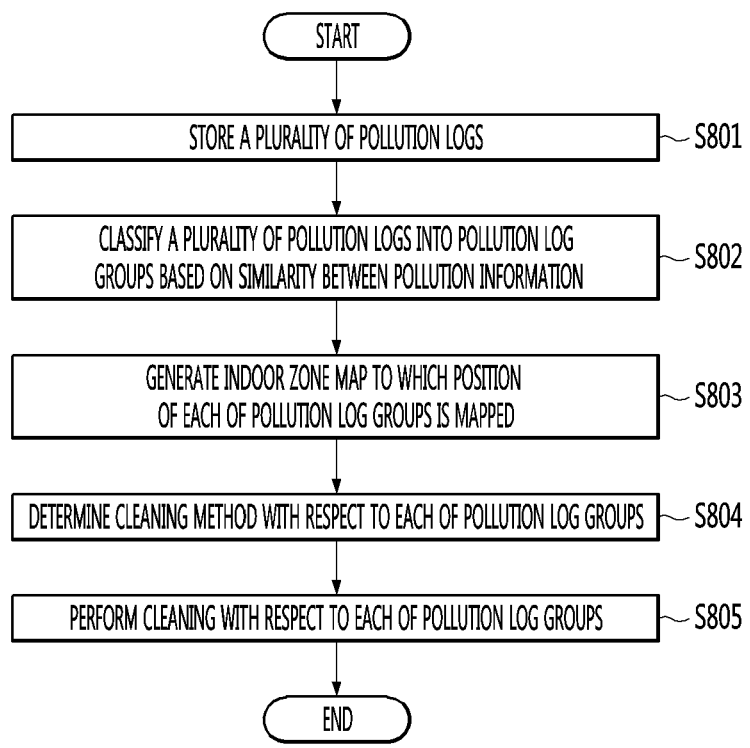
FIG. 8 is an operation flowchart illustrating a method for performing cleaning by an artificial intelligence robot using a pollution log according to an embodiment of the present invention.

FIG. 8 is an operation flowchart illustrating a method for performing cleaning by an artificial intelligence robot using a pollution log according to an embodiment of the present invention.

The memory 170 may store a plurality of pollution logs (S801).

In this case, the pollution log may include pollution information acquired by the artificial intelligence robot 100 while traveling and location information from which the pollution information is acquired. In addition, the pollution information may include information on at least one of a type of pollution, a pollution degree, and a cleaning time.

The processor 180 of the artificial intelligence robot 100 can acquire audio data, image data, vibration data, dust concentration data, object distance data, illuminance data, temperature data, and humidity data. through the camera 121 or the sensing unit 140.

In addition, the processor 180 of the artificial intelligence robot 100 may receive at least one of voice data, image data, vibration data, dust concentration data, object distance data, illuminance data, temperature data, and humidity data acquired by the external device 300 through the communicator 110.

The processor 180 of the artificial intelligence robot 100 may acquire information on the arrangement of the surrounding object or the things by using the acquired voice data, image data, vibration data, object distance data, and illuminance data. In addition, the processor 180 of the artificial intelligence robot 100 may acquire dust concentration, temperature, and humidity by using dust concentration data, temperature data, and humidity data. Therefore, the artificial intelligence robot 100 may acquire pollution information including information on the type of pollution, the pollution degree, and the cleaning time.

For example, the processor 180 of the artificial intelligence robot 100 uses the image data acquired through the camera 121, the sensing unit 140, or the communicator 110 while traveling and acquires a liquid pollution generation and the size of the liquid pollution area and thus the pollution information including the information on the liquid pollution type and the liquid pollution degree can be acquired.

In addition, for example, the processor 180 of the artificial intelligence robot 100 uses image data, dust concentration data, temperature data, and humidity data acquired through the camera 121, the sensing unit 140, or the communicator 110 while driving and acquires the arrangement of the surrounding objects or the things, dust concentration, temperature, and humidity, and thus can determine whether the cleaning is completed in the area where the artificial intelligence robot 100 performs cleaning.

Therefore, when it is determined that the cleaning is completed in the area in which the cleaning is performed, the processor 180 may obtain the cleaning time based on the cleaning start time and the cleaning completion time.

When the pollution information is acquired, the processor 180 may acquire location information from which the pollution information is acquired. Therefore, the processor 180 may store a pollution log including the acquired pollution information and the location information from which the pollution information is acquired in the memory 170.

In addition, the processor 180 may store the plurality of pollution logs in the memory 170 by acquiring the pollution logs at a preset time period.

The learning processor 130 may classify the plurality of pollution logs into at least one pollution log group based on the similarity between the pollution information (S802). For example, the learning processor 130 can classify each of the plurality of pollution logs into at least one pollution log group based on a similarity between the pollution information included in each of the plurality of the pollution logs stored in the memory 170.

For example, the learning processor 130 may classify pollution logs having pollution information including the same pollution type, pollution degree, and cleaning time among a plurality of pollution logs into one pollution log group.

For example, the learning processor 130 classifies the pollution logs with pollution information including information on 'liquid' pollution type, 'high' pollution degree and '10' minute cleaning time into a first pollution log group and classifies pollution logs having pollution information including information on 'dust' pollution type, 'low' pollution degree and '20 minutes' cleaning time may be classified into a second pollution log group.

In addition, the learning processor 130 may classify each of the plurality of pollution logs into at least one pollution log group by providing each of the plurality of pollution logs to the artificial intelligence model.

In addition, the learning processor 130 may label the information on a representative pollution type, a representative pollution degree, and an average cleaning time for each of the at least one pollution log group.

For example, the learning processor 130 can use the pollution log of each pollution log group to label the most pollution type with the representative pollution type, label the average pollution degree with the representative pollution degree, and label information on the average cleaning time with the average of the cleaning time.

In addition, the map generating unit 193 may generate an indoor zone map to which a location of each of at least one pollution log group is mapped (S803).

The map generating unit 193 may generate an indoor zone map divided into at least one or more zones.

The map generating unit 193 may acquire the location of the pollution log group by using the location information from which the pollution information of the pollution log included in the pollution log group is acquired.

In addition, the map generating unit 193 may map the location of each pollution log group to each zone of the indoor zone map. Therefore, the processor 180 of the artificial intelligence robot 100 may determine the pollution log group that the artificial intelligence robot 100 is cleaning by using the location information of the artificial intelligence robot 100.

The processor 180 may determine a cleaning method for each of at least one pollution log group (S804).

For example, the processor 180 may determine a cleaning method for each pollution log group based on the representative pollution type and representative pollution degree of each of the at least one pollution log group.

For example, if the representative pollution type of the first pollution log group is dust pollution and the representative pollution degree of the first pollution log group is high, the processor 180 may determine a cleaning method for the first pollution log group as emergency dust suction cleaning.

In addition, when the representative pollution type of the second pollution log group is liquid pollution and the representative pollution degree of the second pollution log group is low, the processor 180 may determine a cleaning method for the second pollution log group as general water mop cleaning.

The processor 180 may perform cleaning on each of the at least one pollution log group (S805).

For example, the processor 180 controls the driver 160 and the cleaning unit 190 to perform emergency dust suction cleaning with respect to the first pollution log group, and to perform general water mop cleaning with respect to the second pollution log group.

According to an embodiment, the processor 180 may set cleaning priority level for the at least one pollution log group, and perform cleaning in an order corresponding to the set cleaning priority level.

The processor 180 may set the cleaning priority according to the cleaning method of each of the at least one pollution log group. For example, the processor 180 may assign a cleaning priority with respect to the first pollution log group requiring urgent cleaning to be high and assign a cleaning priority with respect to the second pollution log group requiring general cleaning to be low. Therefore, even if the cleaning time is short, the processor 180 may perform cleaning from the pollution log group requiring emergency cleaning.

In addition, the processor 180 assigns a cleaning priority with respect to the first pollution log group having a high representative pollution degree and needs to clean the mop to be low, and a cleaning priority with respect to the second pollution log group requiring a mop cleaning having a low representative pollution degree to be low. Therefore, the processor 180 may perform cleaning from the clean zone by performing mop cleaning from the second pollution log group having a low representative pollution degree.

In addition, the processor 180 may assign a cleaning priority to each of the at least one pollution log group based on the average cleaning time of each of the at least one pollution log group and the cleaning available time of the artificial intelligence robot 100.

In addition, when the cleaning available time of the artificial intelligence robot is smaller than the sum of the average cleaning time of each of the at least one pollution log group, the processor 180 may assign cleaning priority with respect to each of at least one of pollution log group based on the representative pollution degree of each of the at least one pollution log group.

For example, the processor 180 has an average cleaning time of '10 minutes' with respect to the first pollution log group, an average cleaning time of '20 minutes' with respect to the second pollution log group, and a cleaning available time of '15 minutes', the cleaning priority for the first pollution log group with a high degree of representative pollution may be assigned higher than the cleaning priority with respect to the second pollution log group.

In other words, the processor 180 can perform more efficient cleaning based on the cleaning priority of the pollution log group.

In addition, the processor 180 can acquire the pollution information of the pollution log group zone before the start of cleaning through the camera 121, the sensing unit 140, or the communicator 110 while driving, acquire the pollution information of the pollution log group zone after the cleaning is completed and compare the information, and thus acquire the cleaning evaluation result information on the pollution log group.

In addition, the processor 180 can determine the cleaning method for the pollution log group by using the cleaning evaluation result information for the pollution log group.

For example, the processor 180 can acquire positive cleaning evaluation result information when the representative pollution degree of the pollution log group zone before the start of cleaning is high and the representative pollution degree of the pollution log group after the start of cleaning is low and maintain a cleaning method for the pollution log group by using the acquired cleaning evaluation result information.

In addition, for example, when the representative pollution degree of the pollution log group zone before the start of cleaning is high, and the representative pollution degree of the pollution log group after the start of cleaning is high, the processor 180 can acquire negative cleaning evaluation result information and change the cleaning method for the pollution log group using the acquired cleaning evaluation result.

Figure 9:
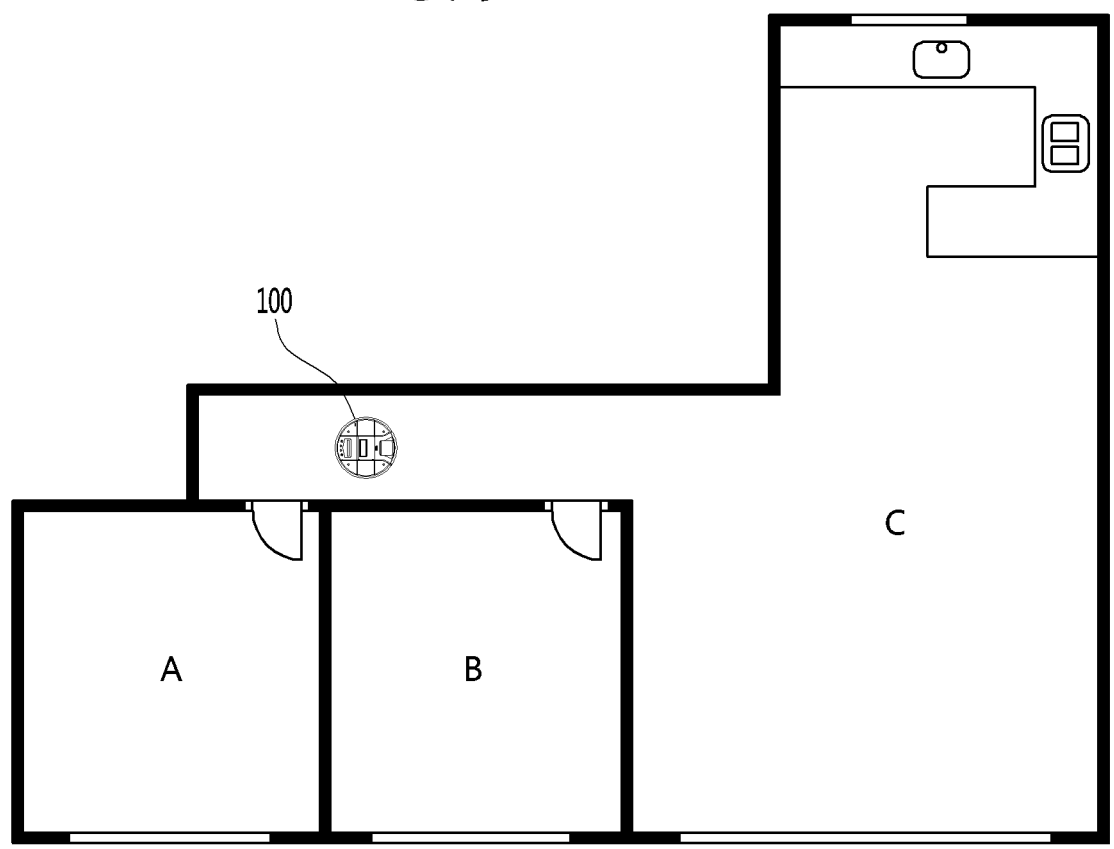
FIGS. 9 to 11 are diagrams for explaining the artificial intelligence robot to perform the cleaning using the contamination log according to an embodiment of the present invention.
Figure 10:
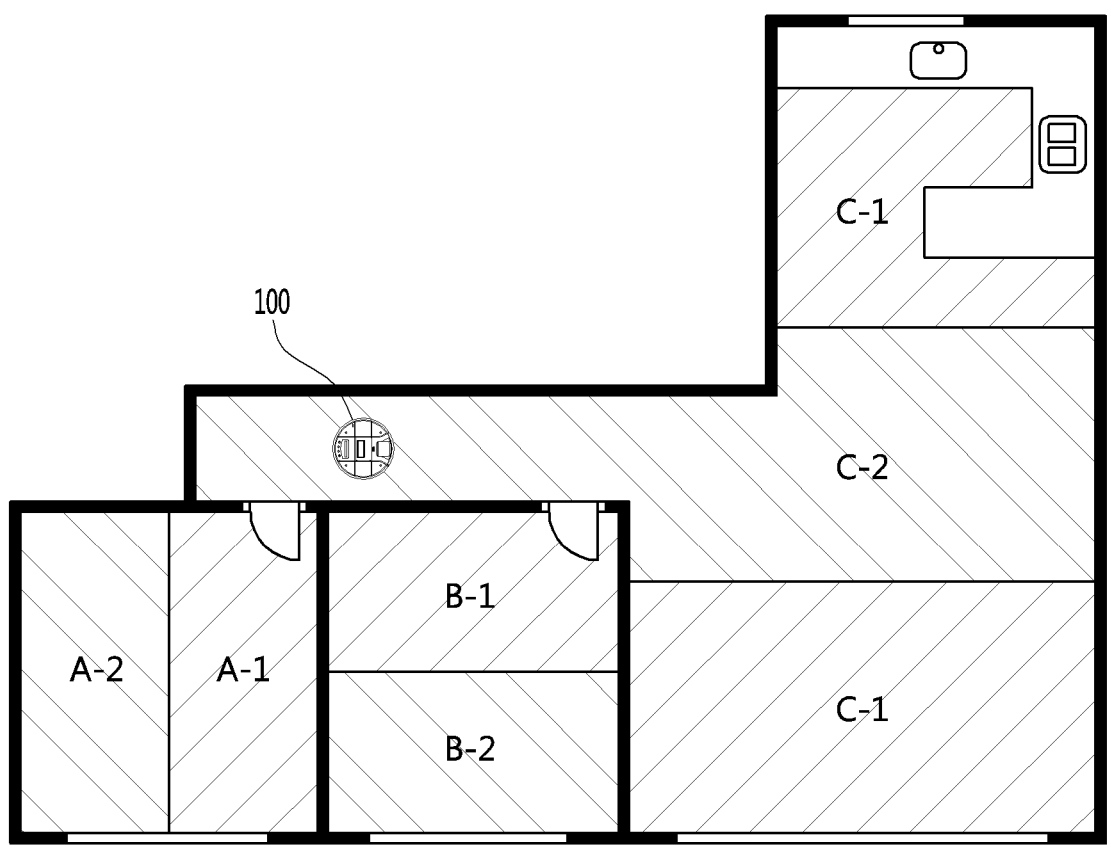
Figure 11:
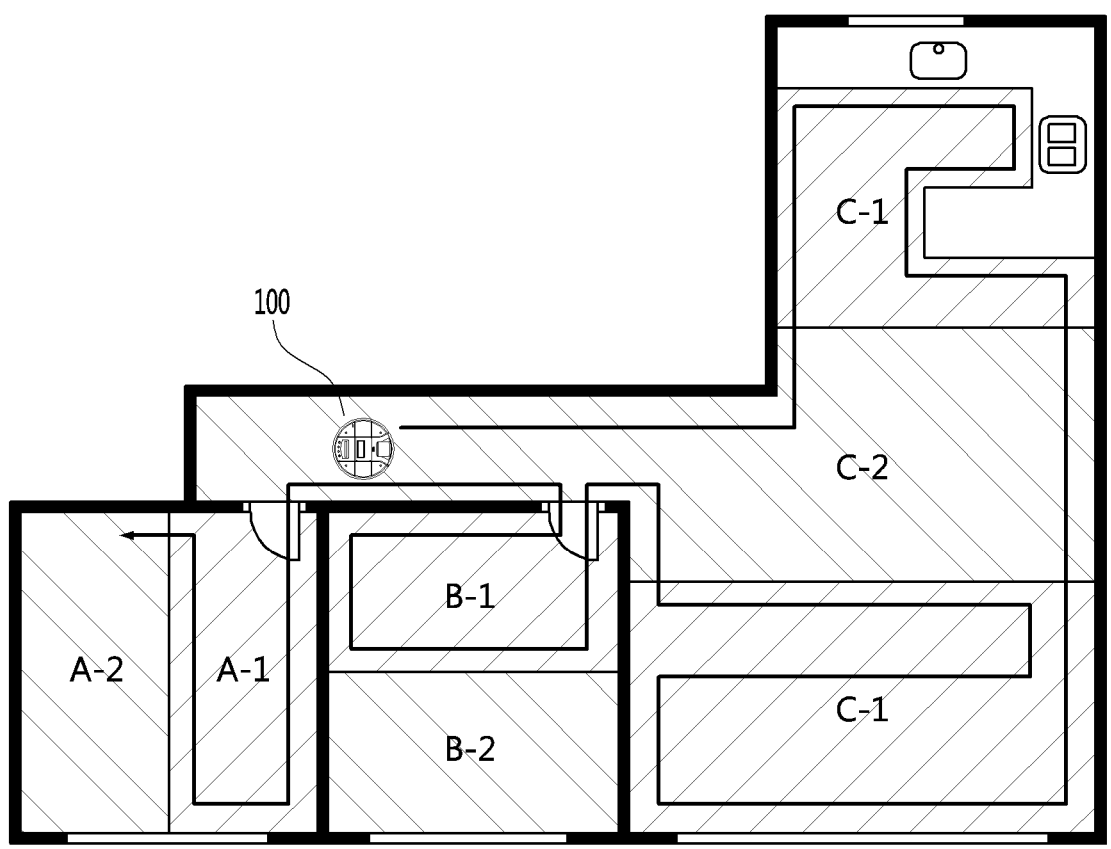

FIGS. 9 to 11 are diagrams for explaining the artificial intelligence robot to perform the cleaning using the contamination log according to an embodiment of the present invention.

The map generating unit 193 of the artificial intelligence robot 100 may generate an indoor zone map divided into 'A', 'B' and 'C' zones.

The processor 180 of the artificial intelligence robot 100 can acquire one of the voice data, the image data, the vibration data, the dust concentration data, the object distance data, the illuminance data, the temperature data, and the humidity data through the camera 121 or the sensing unit 140 while traveling and acquire pollution information including information on the type of pollution, the pollution degree, and the cleaning time of the location or detection area of the artificial intelligence robot 100. Therefore, the processor 180 of the artificial intelligence robot 100 may store the pollution log including the acquired pollution information and the location information from which the pollution information is acquired in the memory 170.

The learning processor 130 may classify the plurality of pollution logs stored in the memory 170 into at least one pollution log group based on the similarity between the pollution information. In addition, the learning processor 130 can generate a first pollution log group having a representative pollution type of 'liquid', a representative pollution degree of 'low' and an average cleaning time of '10' minutes by classifying a plurality of pollution logs and generate a second pollution log group having a representative pollution type of 'liquid', a representative pollution degree of 'high' and an average cleaning time of '20' minutes'.

In addition, the map generating unit 193 may generate an indoor zone map to which locations of at least one pollution log group are mapped. For example, the map generating unit 193 can generate an indoor zoom map which maps the position of the first pollution log group to 'A-1', 'B-1' and 'C-1', and maps the position of the second pollution log group to 'A-2', 'B-2' and 'C-2'.

In addition, the processor 180 may determine a mop cleaning method, since the first pollution log group and the second pollution log group are representative pollution types of 'liquid'.

In addition, the processor 180 may assign a cleaning priority to perform cleaning from the first pollution log group having a low representative pollution degree and perform cleaning. Therefore, cleaning can be performed in a clean zone. Therefore, the processor 180 can control the driver 160 and the cleaning unit 190 to perform cleaning from the zones 'C-1', 'B-1' and 'A-1' of the first pollution log group. Alternatively, when the cleaning available time of the artificial intelligence robot is '15 minutes', the processor 180 may perform cleaning from the second pollution log group having a high representative pollution degree.

The present invention described above can be embodied as the computer readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like. In addition, the computer may also include a processor 180 of the terminal.

What is claimed is:

1. An artificial intelligence robot which performs cleaning using a pollution log, the artificial intelligence robot comprising:
   a memory configured to store a plurality of pollution logs;
   a learning processor configured to classify the plurality of pollution logs into at least one pollution log group based on a similarity between pollution information;
   a map generator configured to generate an indoor area map to which location of each of at least one pollution log group is mapped; and
   a processor configured to determine a cleaning method with respect to each of the at least one pollution log group, based on the pollution log included in each of the at least one pollution log group, assign cleaning priority with respect to each of the at least one pollution log group, based on an average cleaning time of each of the at least one pollution log group and a cleaning available time of the artificial intelligence robot, or the determined cleaning method, and perform cleaning with respect to each of the at least one pollution log group according to the determined cleaning method and the cleaning priority.

2. The artificial intelligence robot of claim 1,
wherein the pollution log includes pollution information acquired while the artificial intelligence robot is driving and location information from which the pollution information is acquired.

3. The artificial intelligence robot of claim 1,
wherein the processor configured to:
acquire cleaning evaluation result information with respect to each of the pollution log groups, and
determine a cleaning method for each of the pollution log groups using the cleaning evaluation result information.

4. The artificial intelligence robot of claim 1,
wherein the pollution information includes information on a pollution type, a pollution degree, and a cleaning time, and
wherein the learning processor classifies the plurality of pollution logs into at least one pollution log group based on the pollution type, the pollution degree, and the cleaning time included in each of the plurality of pollution information.

5. The artificial intelligence robot of claim 1,
wherein the learning processor labels information on a representative pollution type, a representative pollution degree, and an average cleaning time with respect to each of the at least one pollution log group.

6. The artificial intelligence robot of claim 5,
wherein the processor configured to:
determines a cleaning method with respect to each of the at least one pollution log group based on the representative pollution type and the representative pollution degree of each of the at least one pollution log group.

7. The artificial intelligence robot of claim 5,
wherein the learning processor configured to:
acquire the most pollution type, the average pollution degree, and the average of cleaning time, from the at least one pollution log included in a first pollution log group of the at least one pollution log group,
label the most pollution type with the representative pollution type with respect to the first pollution log group,
label the average contamination degree with the representative pollution degree with respect to the first pollution log group, and
label the average of the cleaning time with the average cleaning time.

8. The artificial intelligence robot of claim 5,
wherein the processor configured to:
assign cleaning priority with respect to each of at least one pollution log group based on the representative pollution degree of each of the at least one pollution log group, in a case where the cleaning available time of the artificial intelligence robot is smaller than the sum of the average cleaning time of each of the at least one pollution log group.

9. A cleaning method using pollution information performed by an artificial intelligence robot, the cleaning method comprising:
storing a plurality of pollution logs;
classifying the plurality of pollution logs into at least one pollution log group based on a similarity between the pollution information;
generating an indoor zone map to which location of each of at least one pollution log group is mapped;
determining a cleaning method with respect to each of the at least one pollution log group, based on the pollution log included in each of the at least one pollution log group;
assigning a cleaning priority with respect to each of the at least one pollution log group, based on an average cleaning time of each of the at least one pollution log group and a cleaning available time of the artificial intelligence robot, or the determined cleaning method; and
performing cleaning with respect to each of the at least one pollution log group according to the determined cleaning method and the cleaning priority.

10. The cleaning method of claim 9,
wherein the pollution log includes pollution information acquired while the artificial intelligence robot is driving and location information from which the pollution information is acquired.

11. The cleaning method of claim 9,
wherein the determining the cleaning method includes
acquiring cleaning evaluation result information with respect to each of the pollution log groups, and
determining a cleaning method for each of the pollution log groups using the cleaning evaluation result information.

12. The cleaning method of claim 9,
wherein the pollution information includes information on a pollution type, a pollution degree, and a cleaning time, and
wherein the classifying includes classifying the plurality of pollution logs into at least one pollution log group based on the pollution type, the pollution degree, and the cleaning time included in each of the plurality of pollution information.

13. The cleaning method of claim 9,
wherein the classifying includes labeling information on a representative pollution type, a representative pollution degree, and an average cleaning time with respect to each of the at least one pollution log group.

14. The cleaning method of claim 13,
wherein the determining the cleaning method includes determining a cleaning method with respect to each of the at least one pollution log group based on the representative pollution type and the representative pollution degree of each of the at least one pollution log group.

15. The cleaning method of claim 13,
wherein the performing the cleaning includes
acquiring the most pollution type, the average pollution degree, and the average of cleaning time, from the at least one pollution log included in a first pollution log group of the at least one pollution log group,
labeling the most pollution type with the representative pollution type with respect to the first pollution log group,
labeling the average contamination degree with the representative pollution degree with respect to the first pollution log group, and
labeling the average of the cleaning time with the average cleaning time.

16. The cleaning method of claim 13,
wherein the assigning a cleaning priority to each of the at least one pollution log group includes, assigning cleaning priority with respect to each of at least one pollution log group based on the representative pollution degree of each of the at least one pollution log group, in a case where the cleaning available time of the artificial intelligence robot is smaller than the sum of the average cleaning time of each of the at least one pollution log group.

\* \* \* \* \*